US008898233B2

(12) United States Patent
Ganetakos et al.

(10) Patent No.: US 8,898,233 B2
(45) Date of Patent: Nov. 25, 2014

(54) MATCHMAKING SYSTEM FOR VIRTUAL SOCIAL ENVIRONMENT

(75) Inventors: Joseph Benjamin Ganetakos, Toronto (CA); Jesse Daniel Scoble, Toronto (CA); John Alexander Larsen, Toronto (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 335 days.

(21) Appl. No.: 13/091,400

(22) Filed: Apr. 21, 2011

(65) Prior Publication Data

US 2011/0264741 A1    Oct. 27, 2011

Related U.S. Application Data

(60) Provisional application No. 61/327,250, filed on Apr. 23, 2010.

(51) Int. Cl.
*G06F 15/16*    (2006.01)
*G06Q 30/02*    (2012.01)
*G06Q 50/00*    (2012.01)

(52) U.S. Cl.
CPC ............... *G06Q 30/02* (2013.01); *G06Q 50/01* (2013.01)
USPC ........................................................ 709/204

(58) Field of Classification Search
USPC ........................................................ 709/204
See application file for complete search history.

(56) References Cited

U.S. PATENT DOCUMENTS

| 5,890,963 A | 4/1999 | Yen |
| 5,987,606 A | 11/1999 | Cirasole et al. |
| 6,081,830 A | 6/2000 | Schindler |
| 6,219,045 B1 | 4/2001 | Leahy et al. |
| 6,253,167 B1 | 6/2001 | Matsuda et al. |
| 6,559,863 B1 | 5/2003 | Megiddo |
| 7,054,831 B2 | 5/2006 | Koenig |
| 7,139,796 B2 | 11/2006 | Rekimoto et al. |
| 7,288,028 B2 | 10/2007 | Rodriquez et al. |
| 7,311,608 B1 | 12/2007 | Danieli et al. |
| 7,412,526 B2 | 8/2008 | Fujisawa |
| 7,587,338 B2 | 9/2009 | Owa |

(Continued)

FOREIGN PATENT DOCUMENTS

| GB | 2365364 | 2/2002 |
| JP | 2002063092 | 2/2002 |

OTHER PUBLICATIONS

Look Out, Pokemon: Neopets are Taking Over (Ottawa Citizen, Feb. 7, 2000).

(Continued)

*Primary Examiner* — Richard G Keehn
(74) *Attorney, Agent, or Firm* — Pearne & Gordon LLP (57) ABSTRACT

A matchmaking system is provided herein to facilitate the development of relationships in a virtual social environment. The amount of development (positive or negative) is measured through the detection and analysis of the villager's actions and activity in the virtual social environment. By performing actions including participating in events, activities, sharing an opinion, and giving gifts to other villagers or NPCs present in the environment, a villager creates relationships between herself and other villagers (regardless if owned by the same or different user) or NPCs which then contributes to the development of her own "life" in the virtual social environment. Through this system, villagers are able to meet again based on multiple factors to further develop life-like relationships.

19 Claims, 6 Drawing Sheets

(56) References Cited

U.S. PATENT DOCUMENTS

| | | | |
|---|---|---|---|
| 7,647,560 | B2 | 1/2010 | Macauley et al. |
| 7,677,970 | B2 | 3/2010 | O'Kelley, II et al. |
| 7,846,004 | B2 | 12/2010 | Ganz |
| 8,171,128 | B2 | 5/2012 | Zuckerberg et al. |
| 8,285,654 | B2 * | 10/2012 | Bajrach .................. 706/14 |
| 2002/0007313 | A1 | 1/2002 | Mai et al. |
| 2002/0198940 | A1 | 12/2002 | Bower et al. |
| 2003/0055984 | A1 | 3/2003 | Shimakawa et al. |
| 2003/0065721 | A1 | 4/2003 | Roskind |
| 2004/0259465 | A1 | 12/2004 | Wright et al. |
| 2005/0222906 | A1 | 10/2005 | Chen |
| 2006/0059142 | A1 * | 3/2006 | Zvinyatskovsky et al. ....... 707/5 |
| 2006/0059147 | A1 * | 3/2006 | Weiss et al. ................. 707/6 |
| 2006/0059159 | A1 * | 3/2006 | Truong et al. ................. 707/10 |
| 2006/0123127 | A1 | 6/2006 | Littlefield |
| 2006/0135264 | A1 | 6/2006 | Shaw et al. |
| 2006/0224667 | A1 * | 10/2006 | Amir et al. ................. 709/204 |
| 2007/0073582 | A1 | 3/2007 | Jung et al. |
| 2007/0112624 | A1 | 5/2007 | Jung et al. |
| 2007/0150986 | A1 * | 6/2007 | Jung et al. .................. D21/324 |
| 2008/0009344 | A1 * | 1/2008 | Graham et al. ............... 463/25 |
| 2008/0040428 | A1 | 2/2008 | Wei |
| 2008/0046282 | A1 * | 2/2008 | Teicher ........................... 705/1 |
| 2008/0250332 | A1 | 10/2008 | Farrell et al. |
| 2008/0301557 | A1 * | 12/2008 | Kotlyar ........................ 715/706 |
| 2009/0017915 | A1 | 1/2009 | Baik |
| 2009/0136909 | A1 * | 5/2009 | Asukai et al. ................. 434/236 |
| 2009/0167767 | A1 | 7/2009 | Shoval |
| 2009/0254836 | A1 * | 10/2009 | Bajrach ........................ 715/745 |
| 2010/0114614 | A1 * | 5/2010 | Sharpe ............................ 705/5 |
| 2010/0153095 | A1 | 6/2010 | Yang et al. |
| 2010/0312680 | A1 * | 12/2010 | Jung et al. ...................... 705/35 |

OTHER PUBLICATIONS

Pokemon game mechanics, Wikipedia,<http://web.archive.org/web/20061011003155/en.wikipedia.org/wiki/Pok%C3%A9mon_ Oct. 7, 2006.

The Elder Scrolls III: Morrowind, May 2002 (game release), Wikipedia, <http://en.wikipedia.org/wiki/The_Elder_Scrolls_III:_Morrowind>.

Web site tycoon's next goal: Sixth Grade (Woonsocket Call; Tim Grace, Jun. 19, 2002).

World of Warcraft Manual, 2004.

IGN's Complete Guide to Pokemon: Blue and Red, Apr. 5, 2005.

\* cited by examiner

MATCHMAKING SYSTEM FOR VIRTUAL SOCIAL ENVIRONMENT

CROSS-REFERENCE TO RELATED APPLICATION

This application claims the benefit of U.S. Provisional Application No. 61/327,250, entitled MATCHMAKING FOR GAME PLAY EXPERIENCE and filed on Apr. 23, 2010, the entirety of which is incorporated herein by reference.

FIELD OF THE INVENTION

This application relates generally to computer-based social environments. More specifically, this application relates to a navigational-related system and method that facilitates interaction with and navigation throughout a virtual environment.

BACKGROUND

Once primarily used for research and shopping, the Internet has quickly become an alternative source for entertainment, dating, and multi-player gaming. Through various types of websites, virtual communities have been established that allow users to create a virtual or online reality for themselves. Computer games have also crossed over into the online world, allowing users to play against or along with each other from the comfort of their own homes, Internet cafes or other Wi-Fi outlets around the world. When it comes to most online entertainment activities including gaming and virtual communities, a disconnection unfortunately exists between objects in the real world and objects in the online world.

More recently, however, entertainment websites have been developed in which the website content is directly tied to a product that is purchased by a user. For example, as disclosed in U.S. Pat. No. 7,534,157 to Ganz, incorporated herein by reference, a user purchases a toy that includes a secret code provided in the toy packaging. Access to a certain interactive content on the website provided by the manufacturer of the toy is restricted to users who purchase a toy. When the user carries out a registration process on the manufacturer's website, which involves entering the secret code, a virtual world is presented to the user. The virtual world includes a virtual toy corresponding to the toy purchased by the user. The user can participate in various interactive activities involving the virtual toy. The user may then purchase additional toys and enter the secret codes provided with those toys to add additional virtual toys to the virtual world. These virtual toys can interact with each other, thereby enhancing the user's entertainment experiences. Despite the popularity of such websites, consumers continue to demand more interactive capabilities and more flexibility with respect to their virtual products.

SUMMARY

The subject application involves a system and/or method which facilitate pairing or matching up of participants to facilitate the creation of more complex relationships between such participants in a virtual environment as compared to conventional online websites.

According to one aspect, a computer system for rating relationships between pairs of virtual characters in a virtual world is provided. The system includes a server computer system having a user metrics storage component that collects and stores activity data and relationship data including personality traits of each virtual character of a pair of virtual characters, and points allocated by users for each said virtual character of the pair of virtual characters; said server computer system having a user metrics analysis component that sets a relationship scale value for each character of the pair of virtual characters to an initial value based on a combination of the personality traits assigned to each virtual character of the pair of virtual characters, wherein the relationship scale value is representative of a level of affinity that a first virtual character and a second virtual character of the pair of virtual characters have toward one another, wherein the user metrics analysis component adjusts the relationship scale value based on the activity data and relationship data; and said server computer system sends data related to the relationship scale value for one of the characters of the pair of virtual characters over a computer network in a form for display by a user computer.

Regarding another aspect, a method for rating relationships between pairs of virtual characters in a virtual world is provided. The method includes collecting and storing activity data and relationship data by a server computer system, the relationship data including assigned personality traits of each virtual character of a pair of virtual characters and points allocated by users for each character of the pair of virtual characters; setting, by the server computer system, a relationship scale value for each character of the pair of virtual characters to an initial value based on a combination of the personality traits assigned to each virtual character of the pair of virtual characters, wherein the relationship scale value is representative of the level of affinity for a first virtual character of the pair by a second virtual character of the pair; adjusting, by the server computer system, the relationship scale value based on the relationship data; and transmitting relationship scale data over a computer network for display by a user computer, the relationship scale data being related to the relationship scale value for one of the characters of the pair of virtual characters.

DETAILED DESCRIPTION

As provided herein, the matchmaking system enriches game and play experience in a virtual social environment by increasing the personal investment a player (user) has in their virtual characters (e.g., villagers). A villager can include a virtual representation of a real figurine, or alternatively, just a virtual character, that is displayed online and that lives and exists in the social environment. The villager's actions are controlled by a user and the user can control one or more villagers.

When a villager character is initially set up and customized by the user, the user can choose a personality type for each of their villagers. A range of personality types include but are not limited to happy, grumpy, active, lazy, shy, and flirty. Combinations of these types are also possible. This includes happy-lazy, grumpy-active, etc. Alternative embodiments, however, may use the system to assign that personality type.

With respect to any two villagers, the system generates a relationship scale. In general, the relationship scale is based on the current point value a villager has towards another villager, which is a numerical value representing the level of affinity the villager has for the other villager. When villagers are new to the environment (e.g., newly registered by a user), the system generates an initial relationship scale between them. The initial relationship scale is determined by the matchmaking system according to the personality type of each villager. For example, a personality matrix accessible by the system includes an array of the various personality types and combinations of personality types arranged along the X and Y axes. Individual or a range of point values is assigned for each possible pairing of personality types. The system references the matrix to determine the initial relationship scale between two villagers, when at least one of these villagers is new to the virtual social environment. Relationships as described herein are asymmetrical meaning that it is possible for villager 1 to like villager 2 more than villager 2 likes villager 1 or vice versa.

For example, if villager A has the same personality type as villager B (Happy/Happy, Shy/Shy, etc.), villager A's initial relationship scale toward village B on the scale is between 4 and −4 points. The exact scale value selected within this range is determined randomly. The range of 4 to −4 is determined by the system's personality matrix and can also vary according to the arrangement of the personality matrix.

Similarly, if villager A has the opposite personality type as villager B (Happy/Grumpy, Shy/Flirty, etc.), villager A (with respect to villager B) starts on the scale between 6 and −6 points, within which the precise point value is again determined randomly. Still further, in other possible combinations or pairings of personality types, a villager could have an initial relationship scale somewhere between 1 and −1. In addition to, or as an alternative to the matrix, a personality formula could also be used to determine the initial relationship scale.

The relationships existing between villagers can be readily visualized using the subject system and corresponding user interfaces. For example, the relationship scale of another user's character can be displayed to the user, such as by an emoticon, a number or a graph floating near the character. Other kinds of visualizations can also be used, such as by changing the color or facial expression of the character. In doing so, the characters, e.g., villagers, are able to maintain a sense of awareness and a sense of community with neighboring villagers as well as those that live in other villages, both near and far from their own. The matchmaking system as described herein determines the relationship scale between villagers at any given moment, which facilitates a dynamic and fluid experience in a virtual social environment.

As in the real world but often not existent in the virtual world, relationships between villagers owned by different users as well as between villagers and non-playing characters (NPCs) can be built, developed and managed by a user. A non-playing character or NPC is a virtual character that interacts directly with the player but that does not participate in the environment for playing purposes. For instance, the NPC is a system-controlled 3D character whom the user's villager sees and interacts with as they would with other villagers.

As in real life, the development of a relationship between villagers occurs through their actions either directly or indirectly to another. The amount of development (positive or negative) is measured through the detection and analysis of the users' actions and activity in the virtual social environment. By way of example, giving a gift is an example of a direct action to develop or grow a relationship with that villager, whereas a user using her villager to tell another villager friend that she likes the other villager is less direct but still detectable. By performing actions such as giving gifts to villagers or to NPCs present in the environment, a villager creates relationships between its villager and other villagers or NPCs which then contributes to the development of their own personal story and "life" in the virtual social environment. Assessing villagers' opinions with respect to similar, different or complimentary items also contributes to the development of a relationship between villagers (and their respective users).

The matchmaking and/or relationship development brings a sense of life and more life-like change to the villagers, making return visits more rewarding. Various features include building and creating relationships between villagers which involves relationship scale, modifying relationships through gift giving and point valuations, decay, thresholds, feuds, relationship-driven behavior, jealousy and other complex relationship building between villagers that is atypical of character interaction in a virtual social or game environment.

In addition, the system can monitor relationships and automatically determine emotes (e.g., emoticons or other symbols) to display or present on-screen in connection with the villager based on the villager's moods and emotions. For example, a villager's emote may change from a happy to a mad or feuding emote symbol when the villager is in close proximity to or in a chat type of conversation with another villager who is involved in such "feud". Other villagers who are either present (e.g., same room or location) or in the company of the two feuding villagers will know that the two villagers are involved in an argument without having to ask either one of the feuding villagers or some other villager in the near vicinity.

Figure 1:
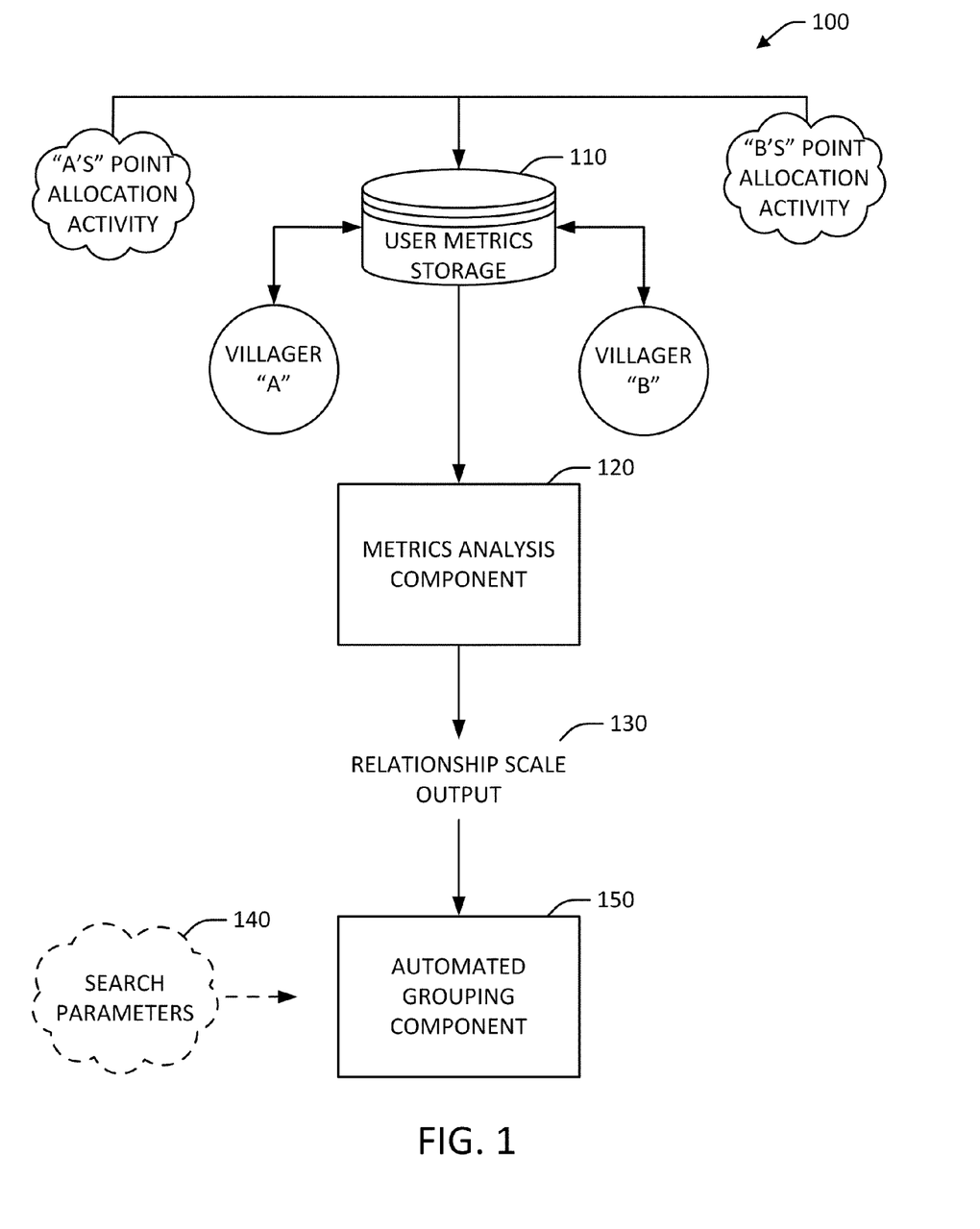
FIG. 1 is a block diagram of an exemplary matchmaking system which facilitates building and managing relationships between users/characters in a virtual social environment.

Turning now to FIG. 1, a block diagram of an exemplary matchmaking system 100 is illustrated. The system 100 is shown as it interacts with two players (villagers) for illustrative purposes only that are either developing or involved in a relationship. It should be appreciated and understood that the system 100 is configurable to interface and interact with multiple villagers involved in one or multiple relationships with other villagers at the same time.

The system 100 includes user metrics storage 110 for villagers "A" and "B" for example. Villagers "A" and "B" are any two villagers (e.g., a pair of villagers) in the virtual environment. It should be appreciated that a villager serves as a virtual representatives of a user, and hence the term 'users' can be interchangeable with the term villagers except where otherwise specified herein.

The user metrics storage 110 collects point allocation activity from villagers "A" and "B" such as the points allocated to each other by the other. Point allocation activity can signify an actual numerical value within a pre-determined range that is allocated to a user by another. Alternatively, point allocation activity can signify a set of predetermined ratings (e.g., star rating) from which the user can select to allocate to another user.

In general, ratings or points are allocated to a user to indicate a positive or negative experience with or reaction to that user. For example, if "A" is playing a game or involved in a quest with "B", then "A" could allocate positive points or give a favorable rating to villager "B". A bad experience with another user could similarly result in a poor rating or a lower or even negative point allocation. The point allocation is stored in the user metrics storage 110 for each user. There may be several user metrics storage components depending on the number of users who participate in the social environment. The storage components are configured to communicate with each other particularly if data corresponding to a group of users is located among more than one user metrics storage.

A metrics analysis component 120 analyzes the point allocations between villagers "A" and "B", for example to determine a relationship scale or current point value of these two users with respect to each other. That is, villager "A" may have a different relationship scale toward villager "B" than villager "B" has toward villager "A". Put another way, villager "A" may like villager "B" more than villager "B" likes villager "A". The analysis and resulting relationship scale determination is based on numerous criteria, which includes but not is limited to the following:
- the initial relationship scale determined based on the personality matrix or other calculation;
- how closely connected the users are (e.g., residents of the same village, neighboring villages or within M number of villages of each other);
- the types of games, quests, events or other activities that the users participate in or like (common likes or dislikes, common opinions about such games, quests, etc);
- whether the users are listed in each other's "friends" or similar type of list;
- the type of ranking each has in terms of skill, karma and the like;
- particular game level; and
- activity history for a particular game, Quest, Event or other activity Because the relationship scale 130 for villagers such as villagers "A" and "B" is determined at any given moment and on a continuous basis, users can perform a search to find, view, and communicate with other users (e.g., via their villagers) that have similar interests, similar dislikes, and similar opinions or those that are quite different in their interests, likes and dislikes and opinions depending on user preference.

When search parameters 140 are entered into the system 100, the relationship scale is communicated to an automated grouping component 150. The automated grouping component 150 identifies villagers based on at least a subset of criteria, including but not limited to the relationship scale, which are relevant to an event, quest or other activity that is being organized in a village or by several villages. For example, if an event for a pet show is being arranged by villager "A" in Village WKZ, villager "A" submits the search criteria, and the automated grouping component 150 identifies other villagers (e.g., within user's "A" village, another village or across desired villages as preferred by villager "A") who have a relationship with villager "A" (e.g., activity organizer) that satisfy or that substantially satisfy the criteria.

The automated grouping component 150 also identifies other villagers (second set) who have relationships with the first set of identified villagers that less closely satisfy the criteria and so on. The organizer can populate their event with some or all of the identified villagers in the first and second sets and even choose to invite others from the nth set of villagers identified. Thus, new relationships between the event organizer and other villagers are formed, and existing relationships between the organizer and the invited or attending villagers are further developed to create a more life-like virtual environment.

Though there may be tens of thousands of villagers in the social environment, any one villager will have the ability to build and grow relationships with other villagers—residing in the same or different village. Moreover, a user is not only matched up with a friend to play a game or to attend an Event. Instead, the user is brought together with more distant villagers or ones that they've interacted with in the past but do not see regularly or very often based in part on the degrees of separation between them. Invitations to Events or other activities are also more tailored to the specific Event and to specific villagers as opposed to being broadcasted to everyone.

Figure 2:
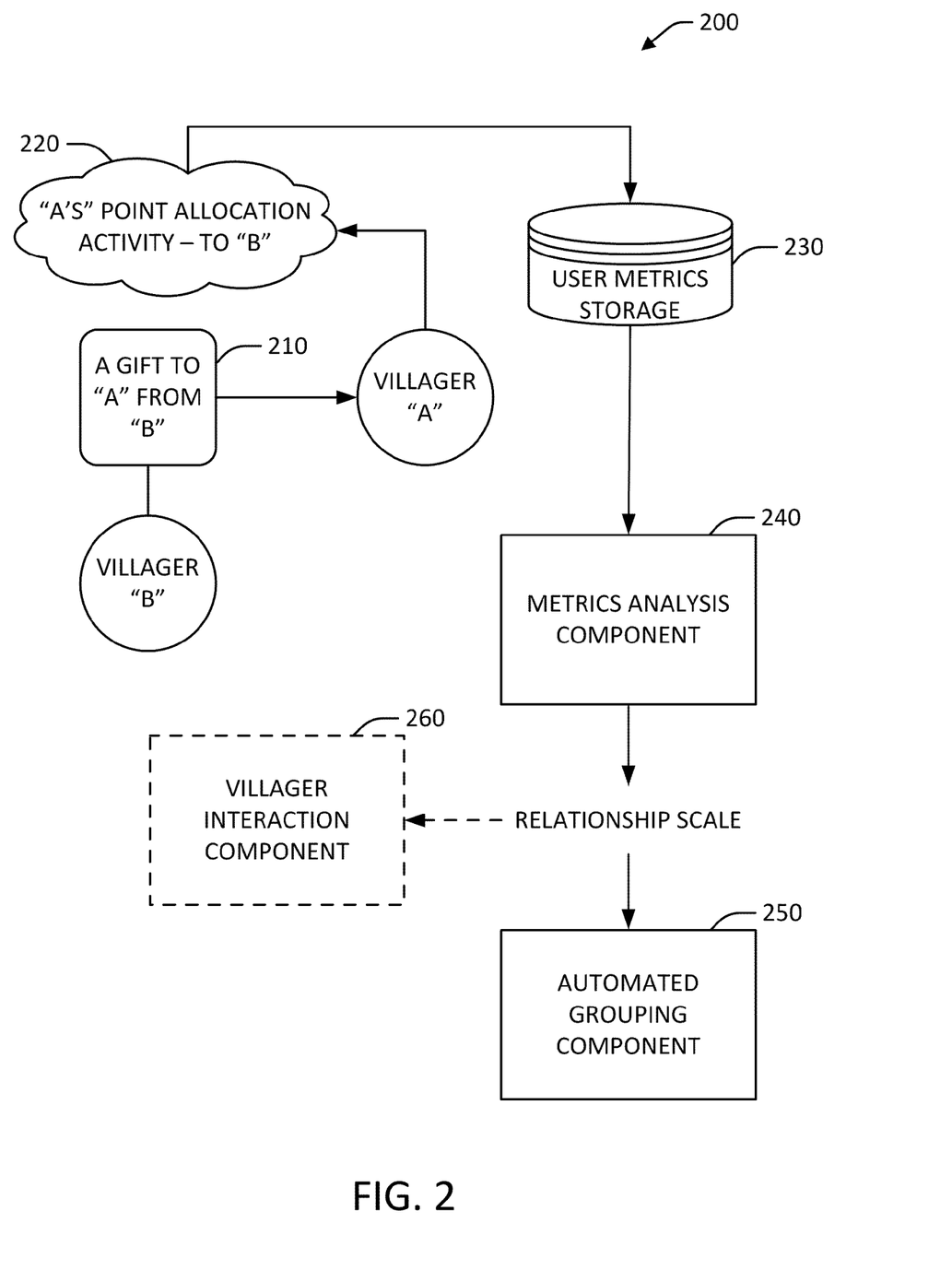
FIG. 2 is a block diagram of an exemplary matchmaking system which facilitates building and managing relationships between users/characters in a virtual social environment.

Turning now to FIG. 2, there is a block diagram of a matchmaking system 200 which is used to facilitate the development of a relationship between participants of a virtual social environment, such as for example villagers "A" and "B". The system 200 demonstrates a practical application with respect to a providing a gift to another participant within the social environment. According to the figure, villager "B" gives a gift to villager "A" (210). In light of the gratitude for such gift and/or its rarity, villager "A" allocates some points or a point value to villager "B" (220). The point allocation to villager "B" is associated or linked to villager "B" (e.g., user account) and stored for villager "B" in user metrics storage 230.

Regarding gift giving in particular, a villager can give G gifts per day. Each gift has a dynamic point value based on the likes and dislikes of the recipient villager as well as the gift's system-defined rarity. Thus, it is possible that the same gift will have a different point value associated with it when given to two different villagers. For instance, if the villager likes the item and gives it a rating of 1 to 5 stars, then the following ratings and corresponding point value is appropriate in determining the gift's point value:
1 Star=+0.5
2 Star=+1
3 Star=+1.5
4 Star=+2
5 Star=+3

However, if the villager dislikes the item, then the following star rating is applicable in determining the point value for the gift:
1 Star=−0.5
2 Star=−1
3 Star=−1.5
4 Star=−2
5 Star=−3

If the villager neither likes nor dislikes the item, he is neutral toward it (e.g., "It's the thought that counts.") and one of the following ratings would be factored into the point value determination:
1 Star=+0.25
2 Star=+0.5
3 Star=+0.75
4 Star=+1
5 Star=+1.5

Other information about each participant is also stored in the user metrics storage 230. This includes but is not limited to items, places, events, games, activities, news (real-life news or social environment news), and food. Information including the allocation of points which is stored in the user metrics storage is communicated to the metrics analysis component 240 to determine the current relationship scale such as between villagers "A" and "B". Their relationship scale as well as that of other villagers is further communicated to an automated grouping component 250.

The automated grouping component 250 evaluates which villagers are likely to be requested or suitable for an activity and provides a list of other villagers and their relationship status with respect to the requestor (e.g., activity organizer). Using a relationship view user interface, a user can readily view their relationships, the status of each and also some information that briefly explains the relationship or its origination or recent interactions with the particular villager.

Optionally, the system 200 can also include a villager interaction component 260 that receives the relationship scale data with respect to villagers such as "A" and "B" and then selects one or more emotes to employ and display. The selected emote(s) characterizes the relationship that "A" has toward "B" and vice versa at a current time T. For example, when "A" sees "B" in the virtual environment and they both have relationship scale corresponding to a "friendship" level toward the other, then their behavior (e.g., emotes displayed) will be similar such as a big smiley face with teeth showing.

As villagers progress up and down the relationship scale, it affects their behavior. The system 200 checks the villagers' relationships against each other, and automatically calls up or suggests, as the case maybe, the appropriate responses or actions, which include but are not limited to the following:

Hang out in public spaces
Visit the other villager's building
Wander together
Follow the other villager
Avoid the other villager
Union Emotes
Love Emotes
Like Emotes
Friendship Emotes
Dislike Emotes
Infuriate Emotes
Antipathy Emotes
Feud Emotes Villagers generate emote bubbles (like a speech bubble, but with key images/symbols) when they see another villager that they have positive or negative feelings for. The emote bubble will appear and stay visible as long as the villagers are in visual range of each other. Villagers can show very different emote bubbles towards each other in accordance with their respective relationship scales.

As is described herein, the matchmaking system 200 in FIG. 2 as well as in the other figures provide an aura of inter-connectedness between villagers regardless of whether they are owned by the same or different users. Similar to real life, there may only be a small degree of separation between villagers. With that in mind, relationships between villagers affect other villager relationships in the subject virtual environment and in accordance with an aspect of the system 200. For example, if villager A and villager B both love villager C and are each working to attain the "love" relationship scale status with C, villagers A and B may begin to feel jealousy toward each other. Assuming that village A and B are (or were) friends, their relationship scales decrease toward each other as each one becomes more jealous of the other. In particular, every time a rival moves up toward the Love status, the system 200 will cause the relationship between the rivals to drop in a similar manner.

Figure 3:
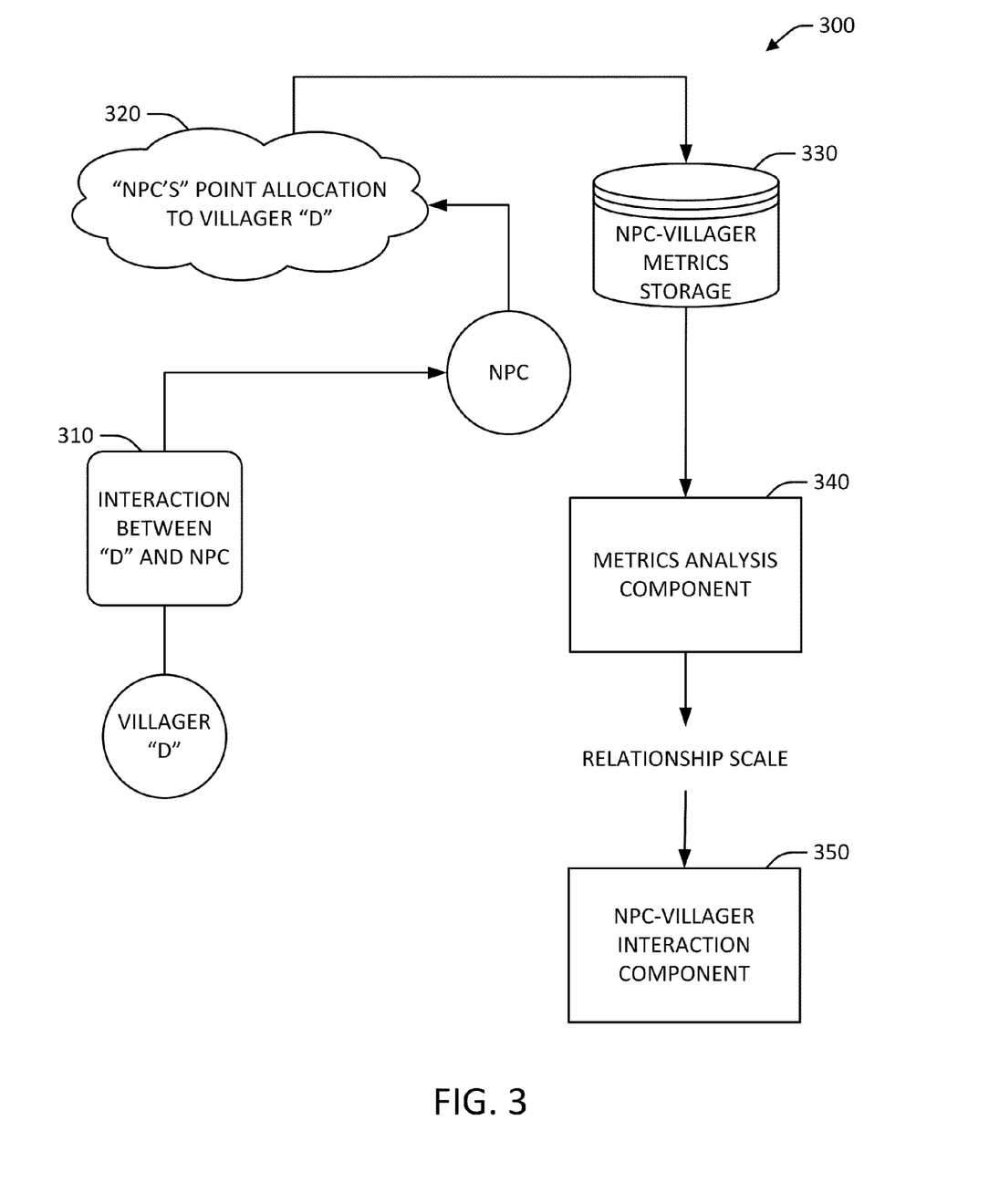
FIG. 3 is a block diagram of an exemplary matchmaking system which facilitates building and managing relationships between users/characters in a virtual social environment.

FIG. 3 depicts a matchmaking system 300 as it is applied to monitor and manage relationships between villagers and NPCs that are a part of the virtual social environment. It should be understood that the system 300 as illustrated in FIG. 3 is merely one application of its components with respect to villager-NPC relationships. In the system 300, interactions 310 between villager "D" and a particular NPC are stored in a database or memory such as by a detection component (not shown). For example, the first interaction between the two is stored and the NPC may allocate point(s) or give a star rating toward user "D" particularly if the interaction is a positive one. The NPC's point allocation activity 320 (or rating activity) is recorded and stored in NPC-villager metrics storage 330.

Similar to the systems 100 and 200 described above, the recorded metrics information is communicated to a metrics analysis component 340, where it is analyzed to determine a relationship scale between user "D" and the NPC. The current relationship scale is then communicated to villager interaction component 350. This interaction component 350 determines or dictates the manner in which or the familiarity with which NPC interacts or converses with user "D". For example, if the current relationship scale at the current time T corresponds to a friendship level (see e.g., exemplary relationship scale table in FIG. 5), then that friendship level dictates the tone or word selection of the dialogue by NPC toward user "D". At this level, for instance, NPC might say to user "D"—"Good to see you, again. How is your day going?"—Whereas a lower relationship scale such as between neutral and friendship might signal the NPC to say "Good morning. How can I help you?" to user "D".

With each additional interaction between the two, the relationship between NPC and user "D" continues to change or is at least maintained given other factors such as a decay factor described in more detail in FIG. 4 below. Moreover, the current relationship scale between villagers and between villagers and NPCs progress and fluctuate in a manner similar to real-life relationships and as a result, affect at least a part of their behavior toward one another.

Figure 4:
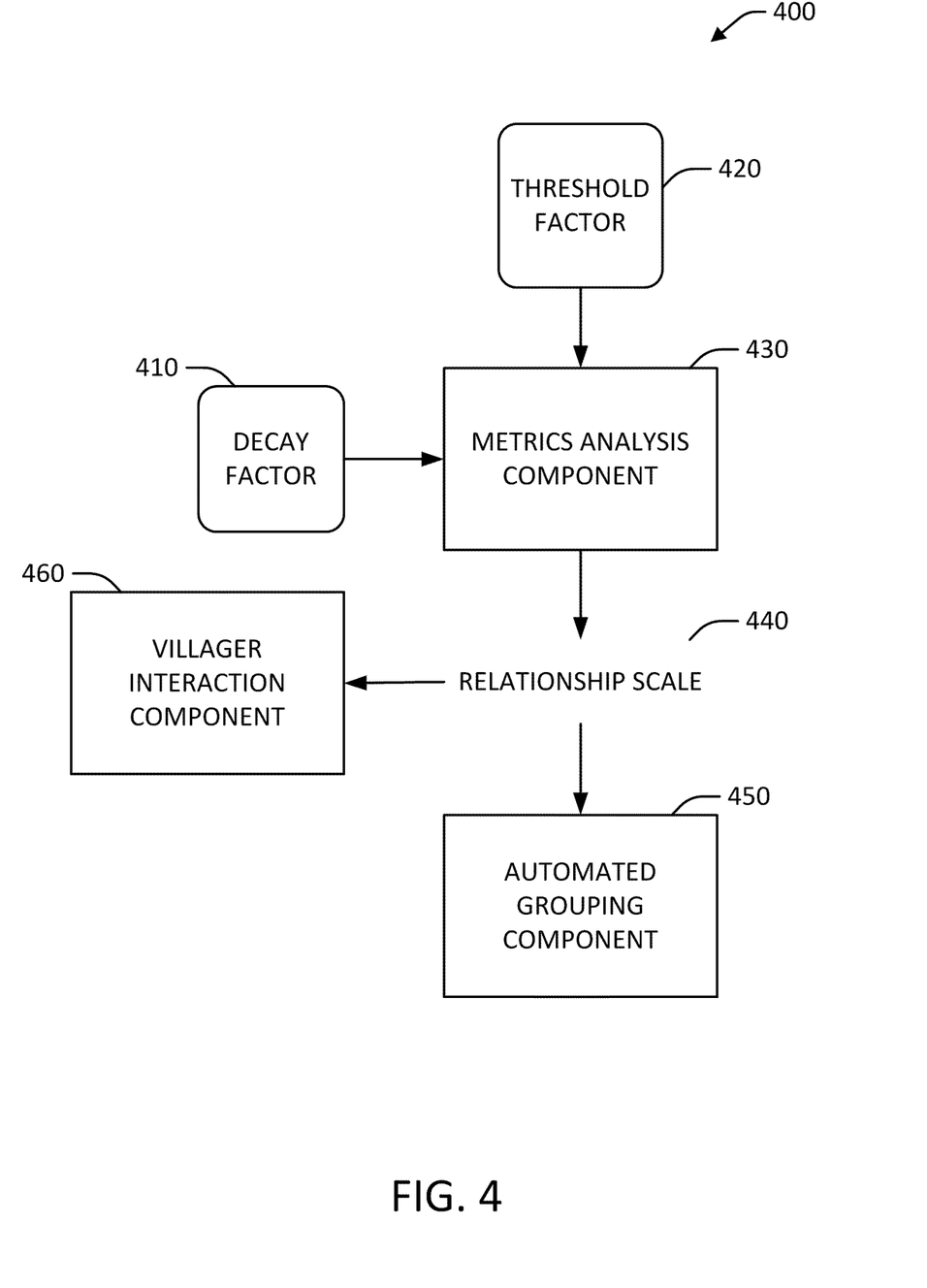
FIG. 4 is a block diagram of an exemplary matchmaking system which illustrates that other factors are considered when determining a relationship scale between users.

Turning now to FIG. 4, a matchmaking system 400 also considers factors such as decay 410 and threshold 420 when analyzing user metrics data (user to user and user to NPC relationships). The villagers' relationships decay by some amount each day, moving back along the spectrum (up or down, accordingly) towards their starting point (e.g., initial relationship scale). The amount of decay is at least a fraction of a point value if a numerical based system is used or at least a fraction of a star or some other value (e.g. ⅛ star, ¼ star, etc.). This includes relationships with other villagers and relationships with NPCs. The metrics analysis component 430 receives the decay factor value 410 and incorporates that factor into its analysis when determining the relationship scale.

Figure 5:
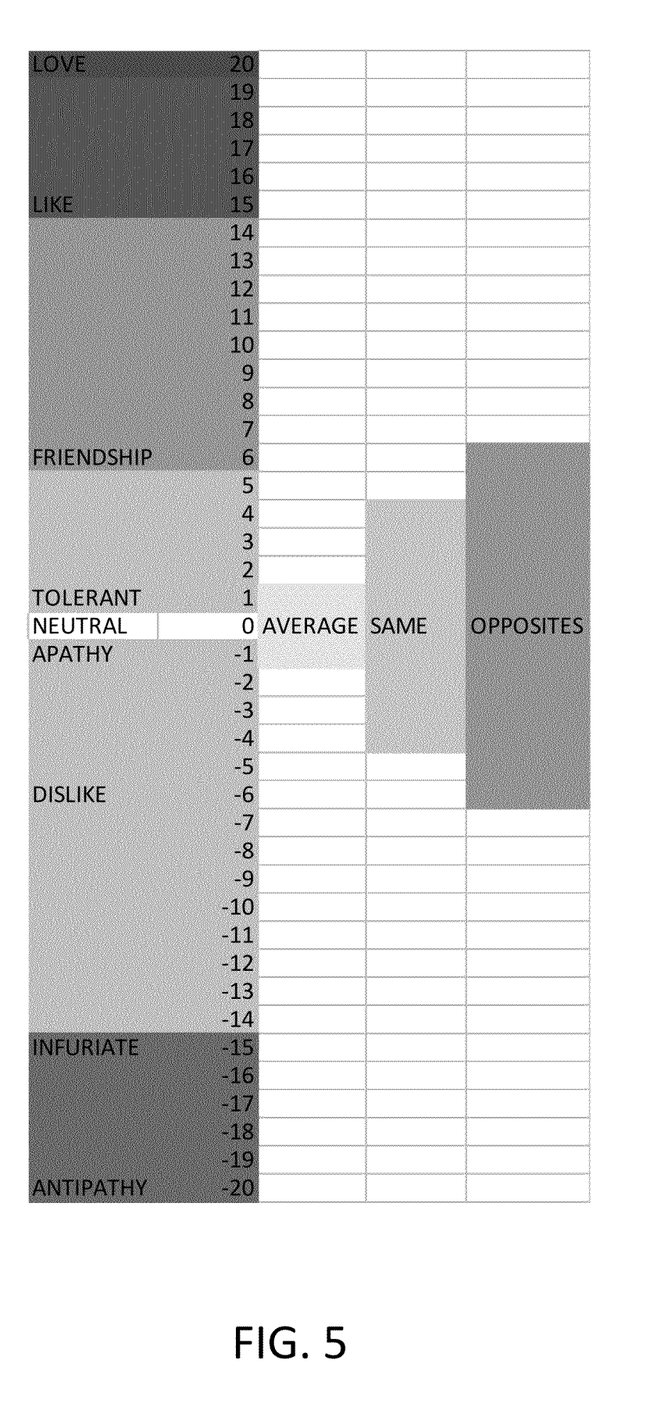
FIG. 5 is a table diagram illustrating a range of point values that correspond to a relationship scale status in accordance with the systems depicted in FIGS. 1-4.

As mentioned above, the relationship scale corresponds to a current point value that one villager has towards another. FIG. 5 is a table diagram illustrating a range of those point values that correspond to a relationship scale status. Each scale status has a range of point values. For instance, "friendship" has a range of point values from 6 to 14. A 'friendship'=14 is indicative of a really close or really good friendship as opposed to a 'friendship'=6. The initial relationship scale that a villager has towards another is calculated by the system (not directly controlled by the users) and based on their personality types—which are assigned by the users. When a relationship decays, it gradually reverts to its initial relationship scale unless the villager performs or participates in some activity that raises or lowers the scale.

For example, imagine that a user named Stephanie has several villagers. Charlie-the-Baker has a "happy" personality type and Chris-the-Chef is the "shy" type. Their starting relationships (determined by the system) are Tolerant=1 (Charlie towards Chris), and Apathy=−1 (Chris towards Charlie). Stephanie spends quite some time giving gifts to each villager from the other, and increases the relationship scale of both up to "like" (Charlie at "like"=8; Chris at "like"=6). However, if Stephanie stops playing in the virtual environment through her villagers or stops giving them gifts from one another, their relationship slowly decays and as a result, it will eventually reach the starting positions of Tolerant=1 and Apathy=−1 again, respectively.

Next imagine that Stephanie wants two of her other villagers to dislike each other. Mary-the-librarian is "happy", but Sam-the-Farmer is "grumpy". Their starting relationship (as determined by the system) are Tolerant=3 (Mary towards Sam), and Apathy=−5 (Sam towards Mary). Stephanie works to get them both to Hate=−15, but she then goes back to school and does not have time to play for some months. As a result, Mary's relationship toward Sam slowly decays back to Tolerant=3 (Mary realizes Sam isn't really that bad after all) and Apathy=−5 (Sam can't be bothered to keep fueling his anger against Mary).

In reference again to FIG. 4, while all relationships decay, if the player has managed to achieve either a positive or negative pinnacle, she will create a "safety net". That is, the system's 400 threshold factor 420 is also considered by the metrics analysis component 430. If the threshold factor 420 indicates that a threshold has been reached (between two specific villagers), then that information is communicated to the metrics analysis component 430. Thresholds or pinnacles exist for 'like' and 'love' on the upper end of the relationship scale and for 'infuriate' on the lower end of the scale. For example, if a user gets a villager to the 'like' status (e.g., anywhere from 15 to 20 points) on the relationship scale, the most the relationship will decay is to the threshold of 'like'=15. The user can give disliked items to bring the relationship down further, for instance, but this is a conscious choice by the user rather than a result of the system's (automatic) decay factor 410. Similarly, if the player gets a villager down to 'infuriate' (between −15 to −20 on the scale), the relationship can only decay to the status of 'infuriate'=−15 by itself by the decay factor 410.

If a player gets two villagers to the pinnacle of positive or negative relationships, it unlocks a special, purchasable item such as an event. For instance, if both villagers are moved up the relationship scale to the pinnacle of love, she can purchase a 'Union Event' for them. This event can be purchased using currency or with a "rare" item or some other item that is accepted in exchange for the Union Event. Alternatively, the system can allow a villager to buy or exchange any items to reach a pinnacle level (e.g., either +19 or −19), but to get to either +20 or −20 on the scale, the villager would need to pay with a rare item; and then once the +20 or −20 scale is reached, the union or feud event could be purchased using (virtual or real) currency.

When a Union event occurs between two villagers, the user who caused the event to occur receives a Union certificate naming both villagers. Both villagers receive a production boost (e.g., extra Village Fund which is a type of currency which is only good for village infrastructure purchases) for one month and there is no decay in their relationship for one month (e.g., honeymoon period). After this honeymoon period, the relationship can decay to the threshold of like (i.e. 15). The Union event also rewards a randomly generated child villager. Even if the Union breaks and reforms with the same two villagers or with a different villager, any two villagers can only produce one free child through a Union event.

If two villagers are moved down the relationship scale to the pinnacle of infuriate, one of them can purchase a Feud Event. The player receives a (framed) Newspaper headline declaring a Feud between the two villagers. Both villagers receive a production boost (e.g., extra Village Fund) for one month, as they work harder to try to out do each other. For this one month, for example, there is no decay in their relationship. After this period, the relationship can decay to the threshold of Infuriate (i.e. −15).

Thus, as described above, certain behaviors are triggered at different threshold levels and certain threshold levels cannot be passed as a result of the systematic decay factor. Once a threshold level and the resulting pinnacle have been reached, villager action is required to surpass the threshold level either in a positive or negative manner.

Figure 6:
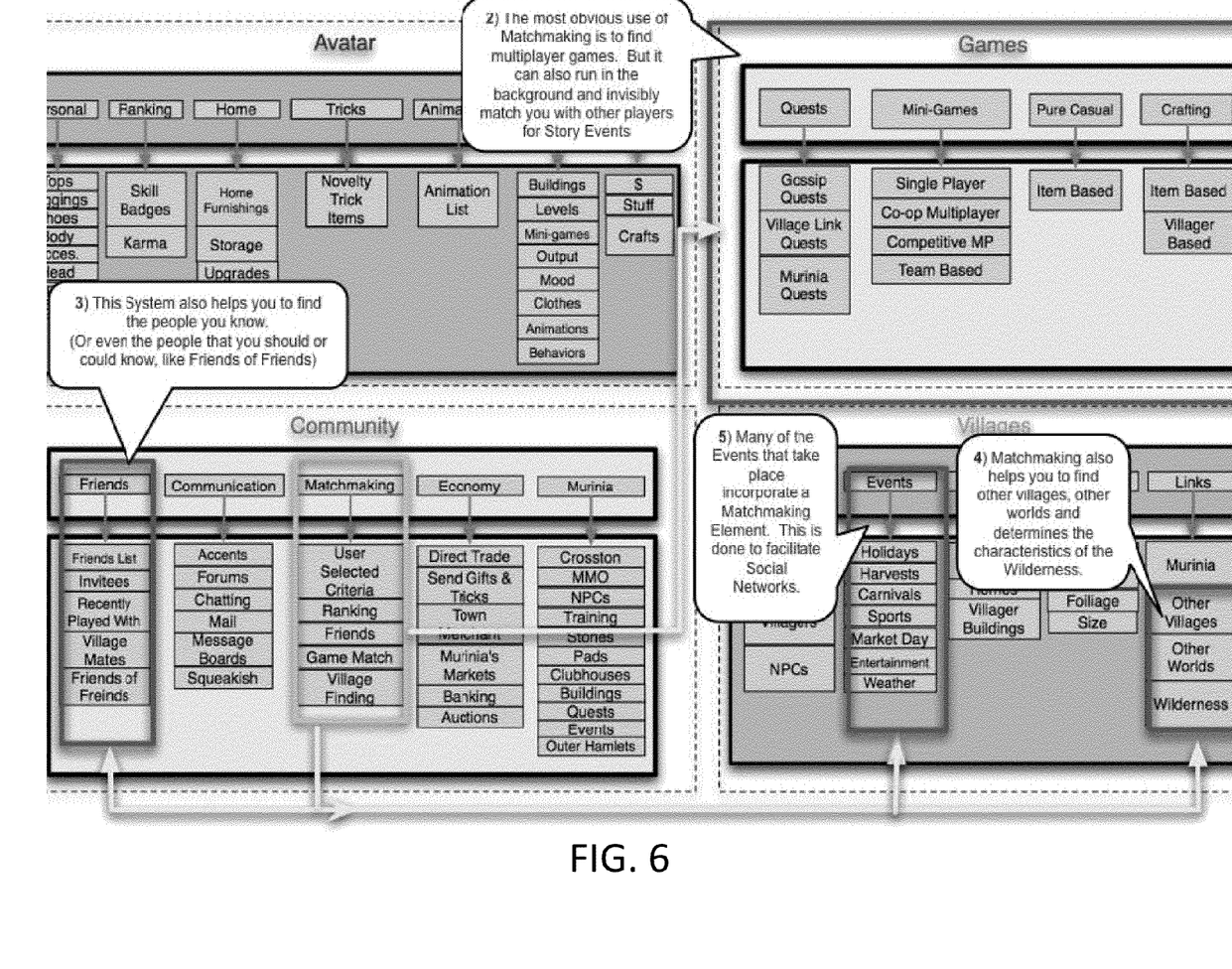
FIG. 6 is a graphical representation of various elements in a virtual social environment which contribute to developing and maintaining relationships among its participants.

The schematic diagram in FIG. 6 shows how various components of the virtual social environment relate to and depend on each other, including the matchmaking system. Many other components of the virtual social environment depend upon the matchmaking system such as its use as a filter and/or as a trigger. If a villager hops into a multiplayer game, for instance, it will pair the villager up with others that have other common or complimentary skills. A group of players that know each other (e.g., based on Y degrees of separation between them) can potentially be 'chosen' for an event, quest, tournament or other multiplayer affair. In addition, villagers rely on the data of how many degrees of separation lies between themselves and other villagers, when determining how and when villages are linked together as neighbors.

FIG. 6 also explains the relationships and dependencies of individual components of the Matchmaking System, and how they work. Players can be matched with each other based on various criteria such as: how closely connected the friends are of various villages, the types of games the players like playing, whether they are in each other's friend list, what type of ranking (Skill, Karma) they have, or based on a list of variables the user can select to filter results (used to find multiplayer games). The Matchmaking System will have ties to the Events System by being the means in which an Event is populated. For instance, to create a sense of a tight-knit community, despite the potential of millions of users being in the game, a Village's Events may only be announced to players who have had recent encounters or are friends-of-friends. This means people will have second or third chances to re-encounter each other and thus have the opportunity to develop friendships.

To intertwine quests with other villagers, the matchmaking system determines which currently-playing villagers might be the most suitable to partner with and then tries to match these villagers together for a quest. A simple example could be that a first villager gives a second villager the mysterious instructions to wait for a mouse that will hang out by the streetlamp in 20 minutes and to deliver a secret note to this mouse. A third villager is instructed to go to a certain village and wait by the streetlamp in 20 minutes to receive the note. This will allow two villagers to meet, and the content of the note determines what they need to do together.

The matchmaking data is used to bring villagers together to play multiplayer mini-games. At times, the user may wish to select some of the criteria for matching, such as Skill Badge, Level etc. The system, will also try to match villagers with others they might nearly know to strengthen the social bonds between them. Instead of 'shouts' and invitations going to every single villager in a large area, matchmaking criteria can help deliver specific 'shouts' or invitations to villagers that have some kind of social connection, as distant and weak as that connection might be.

Though not pictured in FIGS. 1-4, the system 100, for example, also includes a registration component that registers a physical product using a distinct code which identifies the type or name of the physical product. A real user is associated with the physical product through the registration process in which the product is essentially registered in the user's account. As a result of the registration, a virtual representation of the physical product appears on-screen in the virtual environment and the user interacts within the environment through her product's virtual representation. The user controls the actions and behavior of the virtual representation of the physical product. If desired, the user can register multiple physical products using the same account and thus control multiple virtual representations in the environment. The virtual representation serves as the "villager", as that term is used through the rest of this specification.

Each of the systems of FIGS. 1-4 can be separately integrated into or as a part of a computer system, which is employed to generate the virtual environment to be presented to a remotely-located user operating a computing device. The computer system includes an administrative server for managing a variety of administrative tasks. For example, the administrative server can validate registration information associated with physical products being registered by a user, the administration of user accounts, and other such administrative matters.

A web server can also be included as part of the computer system. The web server can host a website comprising the virtual environment as well as other features that are to appear within the virtual environment. The web server can serve content via a communication network to at least a first computing device (e.g., end-user) as well as a second computing device, each being remotely located from the web server and from each other. The administrative server and the web server can optionally be embodied by a single terminal. The communication network can include a wide area network ("WAN"), a local area network ("LAN"), or a combination thereof. For example, the web server may communicate with the first and second computing devices in a known manner using a TCP/IP protocol over the Internet, which is an illustrative embodiment of the communication network. One or both of the computing devices can optionally be connected to the Internet via an internal gateway, router, switch, and/or any other networking devices employed to achieve the Internet connection. In one embodiment, the web server can produce output over the network as an HTML webpage based on a request.

An exemplary architecture of the computer system, particularly the administrative and web servers that collectively operate to generate the virtual environment is described as follows. A non-transitory computer-readable medium such as a hard disk drive is operable as a storage component for storing data involved in maintaining the virtual environment and other content to be served to the computing devices via the communication network. The storage component may also store computer-executable instructions that, when executed by a computer processing unit, provide for the generation and management of the virtual environment as described above.

The foregoing description includes illustrative embodiments of various aspects of the subject system and/or method. It will be apparent to those skilled in the art that the above systems and methods may incorporate changes and modifications without departing from the general scope of this invention. It is intended to include all such modifications and alterations within the scope of the subject application. Furthermore, to the extent that the term "includes" is used in either the detailed description or the claims, such term is intended to be inclusive in a manner similar to the term "comprising" as interpreted when employed as a transitional word in a claim.

What is claimed is:

1. A computer system for rating relationships between pairs of virtual characters in a virtual world comprising:
    a server computer having a user metrics storage component that collects and stores activity data and relationship data including personality traits of each virtual character of a pair of virtual characters and points that are allocated from each virtual character to each other of the pair of virtual characters;
    said server computer further comprises a user metrics analysis component that sets a relationship scale value for each character of the pair of virtual characters to an initial value based on a combination of the personality traits assigned to each virtual character of the pair of virtual characters, wherein the initial value of the relationship scale value is randomly selected from a predetermined range of points on a relationship scale determined by an initial personality type of each character and wherein the relationship scale value is representative of a level of affinity that a first virtual character and a second virtual character of the pair of virtual characters have toward one another,
    wherein the user metrics analysis component adjusts the relationship scale value based on the activity data and relationship data; and
    said server computer sends data related to the relationship scale value for one of the characters of the pair of virtual characters over a computer network and displayed on a user computer.

2. The computer system of claim 1 further comprising:
    an automated grouping component of the server computer, wherein a plurality of pairs of virtual characters each comprise first and second virtual characters, each first virtual character having an assigned relationship scale value representative of the affinity of the first virtual character for the second virtual character, and
    wherein the automated grouping component selects at least a first subset of virtual characters whose relationship scale satisfies at least one search criteria within a variable degree from the search criteria where said first subset is selected for a group activity.

3. The computer system of claim 1 further comprising:
    a virtual character interaction component of the server computer that receives the relationship scale value for each virtual character of the pair of virtual characters and then selects one or more emotes to transmit over a computer network for display with a first one of the pair of virtual characters, wherein the selected emotes characterize the relationship that the first one has toward a second one of the pair of virtual characters at a current time.

4. The computer system of claim 1, where the relationship scale of a first virtual character with respect to a second virtual character is displayed with the first virtual character when the first and second virtual characters come into proximity of each other within the virtual world.

5. The computer system of claim 1, wherein the user metrics analysis component adjusts the relationship scale value based on at least one of:
    the points allocated by the users;
    a gift given by one of the characters to the other character of the pair;
    a proximity of residences of each of the first and second characters of the pair;

amount of participation in common activities by the first and second characters of the pair;

amount of likes or dislikes shared by the first and second characters of the pair;

amount of complimentary skills, likes or dislikes by the first and second characters of the pair;

presence of one of the characters of the pair in the other character's friends list;

similarity of rankings or characteristics of the first and second characters of the pair;

whether the first and second characters of the pair are on a same or similar game level; and history of participation in a particular activity together by the first and second characters of the pair.

6. The computer system of claim 1 further comprising a decay factor component of the server computer that causes the user metric analysis component to automatically adjust the relationship scale value for each virtual character toward the initial value based on a lapse of time, such that each relationship scale value eventually returns to the corresponding initial value if not otherwise adjusted by the user metric analysis component.

7. The computer system of claim 6, wherein once the relationship scale value for one of the virtual characters attains a threshold value, the decay factor component cannot cause the relationship scale value to decay past the threshold value.

8. The computer system of claim 7, wherein even after one of the virtual characters attains the threshold value, the user metric analysis component can adjust the relationship scale value past the threshold value in response to activity by the virtual character.

9. The computer system of claim 6, wherein once the relationship scale value for one of the virtual characters attains a special threshold value, the decay factor component cannot cause the relationship scale value to decay past the threshold value until after a predetermined period of time.

10. A method for rating relationships between pairs of virtual characters in a virtual world comprising:

collecting and storing activity data and relationship data by a server computer, the relationship data including assigned personality traits of each virtual character of a pair of virtual characters and points allocated from each character to the other character of the pair of virtual characters;

setting, by the server computer, a relationship scale value for each character of the pair of virtual characters to an initial value based on a combination of the personality traits assigned to each virtual character of the pair of virtual characters and the points allocated from each character to the other, wherein the initial value of the relationship scale value is randomly selected from a predetermined range of points on a relationship scale determined by an initial personality type of each character and wherein the relationship scale value is representative of the level of affinity for a first virtual character of the pair by a second virtual character of the pair;

adjusting, by the server computer, the relationship scale value based on the relationship data; and transmitting relationship scale data over a computer network for display by a user computer, the relationship scale data being related to the relationship scale value for one of the characters of the pair of virtual characters.

11. The method of claim 10, wherein a plurality of pairs of virtual characters each comprise first and second virtual characters, each first virtual character having an assigned relationship scale value representative of the affinity of the first virtual character for the second virtual character, and further comprising:

grouping, by the server computer, at least a subset of the first virtual characters to participate in an identified group activity based on the respective assigned relationship scale value.

12. The method claim 10, wherein each initial value is based on a personality type matrix.

13. The method of claim 10 further comprising:

receiving the relationship scale value for each virtual character of the pair of virtual characters and then selecting one or more emotes to transmit over a computer network for display with a first one of the pair of virtual characters, wherein the selected emotes characterize the relationship that the first one has toward a second one of the pair of virtual characters at a current time.

14. The method of claim 10, where the relationship scale of a first virtual character to a second virtual character is displayed with the first virtual character when the first and second virtual characters come into proximity within the virtual world.

15. The method of claim 10, wherein said adjusting adjusts the relationship scale value based on two or more of the following:

the points allocated by the users;

a gift given by one of the characters to the other character of the pair;

amount of participation in common activities by the first and second characters of the pair;

amount of likes or dislikes shared by the first and second characters of the pair;

presence of one of the characters of the pair in the other character's friends list;

similarity of rankings or characteristics of the first and second characters of the pair;

whether the first and second characters of the pair are on a same or similar game level; and history of participation in a particular activity together by the first and second characters of the pair.

16. The method of claim 10 further comprising decaying the relationship scale value for each virtual character toward the initial value based on a lapse of time, such that each relationship scale value eventually returns to the corresponding initial value if not otherwise adjusted.

17. The method of claim 16, wherein once the relationship scale value for one of the virtual characters attains a threshold value, said decaying cannot cause the relationship scale value to decay past the threshold value.

18. The method of claim 17, wherein even after one of the virtual characters attains the threshold value, said adjusting can adjust the relationship scale value past the threshold value in response to activity by the virtual character.

19. The method of claim 16, wherein once the relationship scale value for one of the virtual characters attains a special threshold value, said decaying cannot cause the relationship scale value to decay past the threshold value until after a predetermined period of time.

\* \* \* \* \*